United States Patent [19]

Skarstad et al.

[11] Patent Number: 4,465,743
[45] Date of Patent: Aug. 14, 1984

[54] ELECTROCHEMICAL CELLS HAVING LITHIUM TETRACHLOROIODATE CATHODES

[75] Inventors: Paul M. Skarstad, Plymouth; Thomas G. Hayes, Minneapolis, both of Minn.

[73] Assignee: Medtronic, Inc., Minneapolis, Minn.

[21] Appl. No.: 449,966

[22] Filed: Dec. 15, 1982

[51] Int. Cl.³ .............................................. H01M 6/16
[52] U.S. Cl. .................................... 429/105; 429/196; 429/199; 429/218
[58] Field of Search ................. 429/48, 101, 105, 194, 429/196, 197, 199, 218

[56] References Cited

U.S. PATENT DOCUMENTS

| | | | |
|---|---|---|---|
| 3,993,501 | 11/1976 | Kalnoki-Kis | 429/48 |
| 4,128,703 | 12/1978 | Mead et al. | 429/199 X |
| 4,132,836 | 1/1979 | Greatbatch | 429/218 X |
| 4,170,693 | 10/1979 | Catanzarite | 429/101 X |
| 4,246,327 | 1/1981 | Skarstad | 429/194 X |
| 4,247,609 | 1/1981 | Feiman et al. | 429/199 X |
| 4,296,185 | 10/1981 | Catanzarite | 429/48 |

*Primary Examiner*—Anthony Skapars
*Attorney, Agent, or Firm*—Schroeder, Siegfried, Vidas & Arrett

[57] ABSTRACT

Electrochemical cells comprising an active metallic anode, preferably lithium, a non-aqueous electrolyte, preferably thionyl chloride, and a lithium tetrachloroiodate ($LiICl_4$) cathode.

18 Claims, 4 Drawing Figures

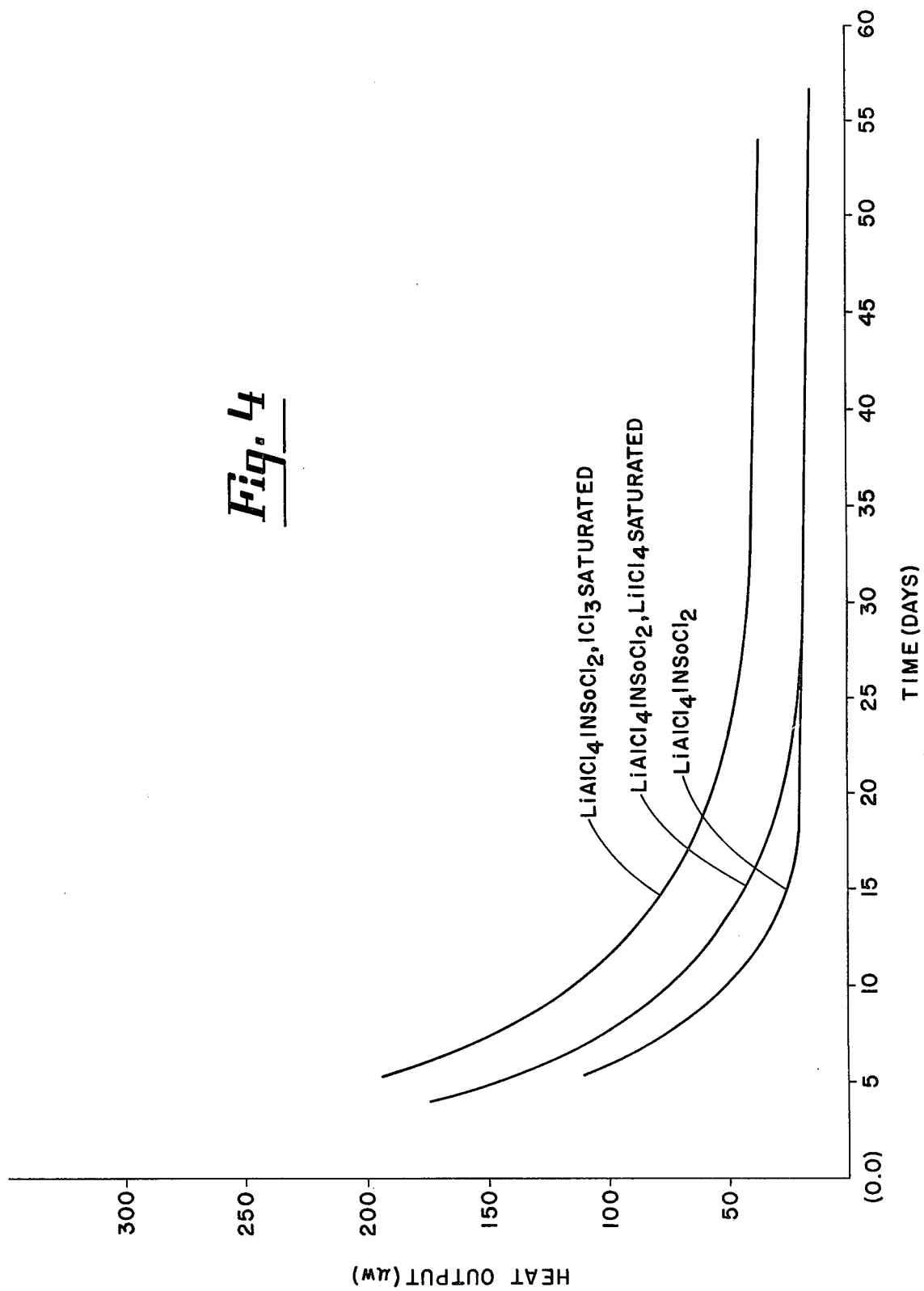

ELECTROCHEMICAL CELLS HAVING LITHIUM TETRACHLOROIODATE CATHODES

Description

Background of the Prior Art

This invention relates generally to improved primary electrochemical cells. A variety of such cells in high energy-density form have become available in recent years.

Among such cells are high energy-density thionyl chloride cells. These cells typically use a lithium anode and an electrolyte solution of a lithium salt and thionyl chloride in an appropriate solvent:

$$Li/SOCl_2, LiX/C$$

These cells make use of lithium ion transport and deposit a lithium chloride (LiCl) discharge product over a high-surface-area electrode, such as a porous carbon body. Consequently, the problems associated with the formation of a high resistance discharge product are avoided.

A related type of cell having a lithium anode and using an iodine trichloride ($ICl_3$) cathode and an inorganic electrolyte such as thionyl chloride is disclosed in U.S. Pat. No. 4,246,327, issued Jan. 20, 1981 to Skarstad, et al. An example of such a cell is:

$$Li/SOCl_2, LiX, ICl_3/ICl_3(S),C.$$

Electrochemical cells of this type have particular utility in long-life applications in which a relatively flat voltage output is required at moderate to high current densities. In practice, however, self-discharge rates are higher than desired for these cells, tending to diminish the energy advantage of the cells for long-term applications.

It is believed that the most important factor limiting self-discharge in this latter type of cell is passivation of the anode and related anode structure, such as any exposed anode current collector or the like. Passivation is caused by the formation of a protective chloride film formed by reaction with the anode metal, such as the formation of lithium chloride (LiCl) in the case of a cell having a lithium anode.

However, it also appears that in these cells the free $ICl_3$ complexes the chloride film causing it to dissolve and expose fresh anode metal for reaction and formation of additional film. The result is high self-discharge rates.

Summary of the Invention

It is a primary object of this invention to provide primary electrochemical cells which exhibit improved capacity and low self-discharge rates.

In general, this invention utilizes a tetrachloroiodate salt cathode of the general formula $M(ICl_4)_n$, where $n=1$ or 2, leading to cells of the following type:
$R_1$/liq. inorganic electrolyte, $R_2X$, $M(ICl_4)_n$/-$M(ICl_4)_n(s)$,C where:
$R_1$ is Li or Ca;
the liquid inorganic electrolyte is a liquid oxyhalide or liquid thiohalide;
$R_2$ is Li when $R_1$ is Li and $R_2$ is Li or Ca when $R_1$ is Ca;
X is any anion which combines with lithium or calcium to form salts soluble in the inorganic electrolyte and yield lithium or calcium ions, increasing the conductivity of the electrolyte;
M is Li, Na, K, Rb, Cs, Sr or Ba when $R_1$ is Li, and M is Li, Na, K, Rb, Cs, Sr, Ba or Ca when $R_1$ is Ca;
$n=1$ or 2; and
C is any inert, electrically conductive, high-surface area material.

The $M(ICl_4)_n$ tetrachloroiodate salt is basically a complexed form of $ICl_3$. Because of this, its ability to complex additional chloride ion is reduced. As a consequence, the passivating coating on the anode is no longer attacked, and therefore self-discharge is minimized.

Since in principle nothing is completely insoluble, the tetrachloroiodate cathode of the invention will include dissolved tetrachloroiodate salt at least in part, as well as solid tetrachloroiodate salt, whenever the cell is of the type which includes a solid tetrachloroiodate cathode. The cell schematic included above is intended to describe cathodes, which may be relatively insoluble and those which may be relatively soluble. In the case of relatively soluble tetrachloroiodate salts, the presence of a solid cathode may be readily assured if desired by providing quantities of the salt in excess of an amount required to saturate the electrolyte. The relative amounts of dissolved salt and solid salt are determined by the solubility of the particular salt and electrolyte used and the amount provided. However, it is also possible, as will be seen from some of the Examples included herein, to provide in accordance with this invention, for tetrachloroiodate cathodes which are completely dissolved in the electrolyte, no solid phase being present at all, i.e.

$R_1$/liquid inorganic electrolyte, $R_2X$, $M(ICl_4)_n$/c

Where the term "cathode" is used herein, it is intended that it include all of these variations generally, unless the term is specifically modified so as to describe either a cathod of dissolved form only, a solid cathode or a solid/dissolved (two-phase) cathode.

In any event, the various forms of the cathode of the invention provide an improved primary electrochemical cell which comprises in any suitable arrangement, configuration and receptacle, a lithium or calcium anode together with a tetrachloroiodate cathode and a liquid inorganic electrolyte including a dissolved, conductivity enhancing metal salt. The dissolved metal salt may be present in concentrations up to saturation, although a range of concentration of about 1 to 2 molar is ordinarily satisfactory.

Electrochemical cells of the invention will in preferred form comprise a lithium anode, a lithium tetrachloroiodate cathode and a liquid oxyhalide electrolyte, most preferably of phosphorous or sulphur, and a dissolved conductivity enhancing lithium salt.

The invention in a more preferred form makes use of the highly energetic lithium anode, lithium ion transport and a high-surface-area carbon cathode current collector. The electrolyte solvent includes a liquid oxyhalide, preferably thionyl chloride, in which lithium salts are dissolved for increased conductivity. Most preferably, the anode is coated with a polymer coating at least on its active surface. The polymer coating is described in more detail hereinbelow.

A most preferred form of the invention comprises a cell including an $SOCl_2$ electrolyte containing $LiAlCl_4$ and including a $LiICl_4$ cathode. Although not necessary but preferably, the tetrachloroiodate will be present as a solid phase.

In the cells of this invention the cathode is operatively contacted by a high-surface-area cathode current collector means and the anode, cathode and electrolyte are operatively associated with each other, preferably through a porous separator. Most preferably, the cathode is a solid, impregnated within a porous carbon body which functions as a high-surface-area collector.

BRIEF DESCRIPTION OF THE DRAWINGS

FIG. 4 is a graph showing heat output versus time for various cathode/electrolyte compositions (microcalorimeter data).

DESCRIPTION OF THE PREFERRED EMBODIMENT

Figure 1:
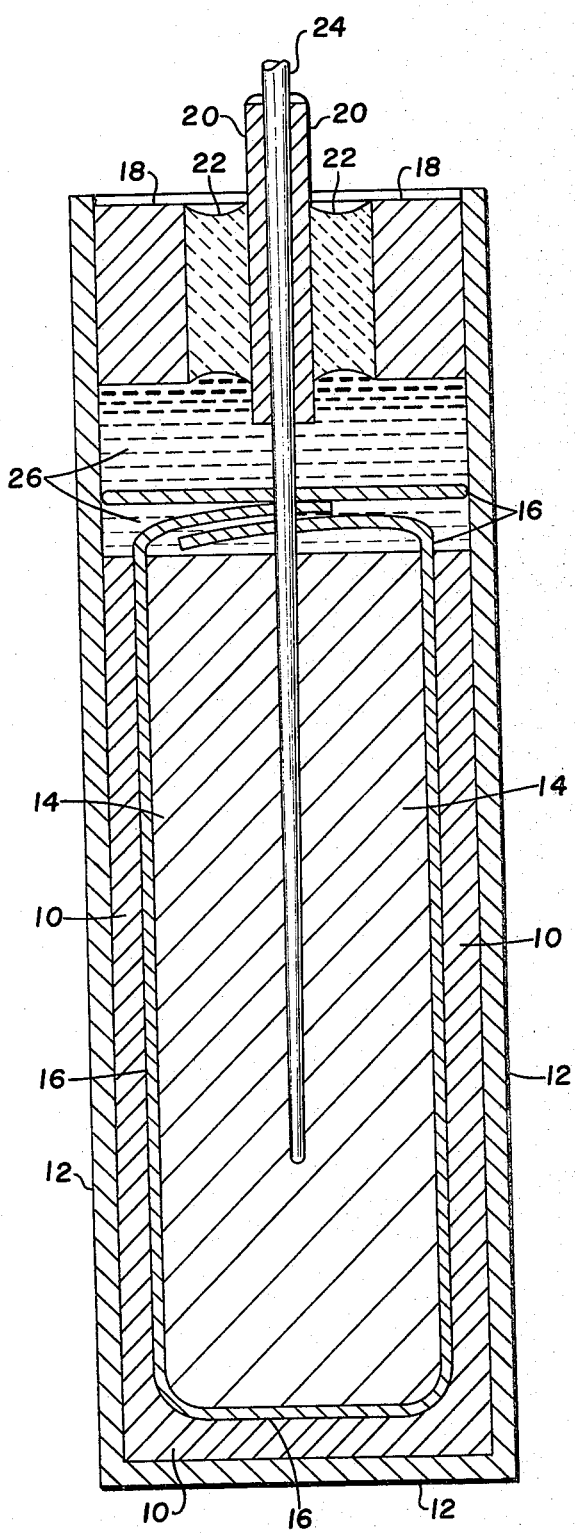
FIG. 1 is a schematic drawing of a cell incorporating the improvements of the invention.

The invention in its broad aspects is not directed to any particular design configuration, but rather to any configuration including a lithium or calcium anode, a tetrachloroiodate cathode and a non-aqueous liquid inorganic electrolyte operatively associating the anode and cathode.

Related prior art cells such as the types described hereinabove are known to incorporate various organic coatings and contiguous films on at least the operative surfaces of the active metal anode. Such coatings and contiguous films are referred to herein collectively as "coatings." The purpose of these coatings is to reduce or limit passivation effects on the anode. Examples of such coatings are disclosed in U.S. Pat. No. 4,170,693 (methyl cyanoacrylate, ethyl cyanoacrylate, ethyl acetate, acrylonitrile), U.S. Pat. No. 4,296,185 (propyl cyanoacrylate and isobutyl cyanoacrylate) and U.S. Pat No. 3,993,501 (various vinyl polymers). Such coatings are preferably incorporated into the cells of this invention and are referred to generally herein as "organic coatings."

In preferred form, as already noted, the electrochemical cells of the invention discharge lithium tetrachloroiodate against an anode consisting essentially of lithium. Lithium anodes may be formed by pressing lithium foil onto nickel or stainless steel screen or the like, although various other styles and configurations may be utilized.

While it is preferred that the anode be essentially pure lithium, pure calcium may also be used. In either case the anode need only consist essentially of lithium or calcium. Thus, it is to be understood that alloys of lithium and alloys of calcium may be used as well. For example, in the case of lithium anodes, lithium alloys containing magnesium or other elements may be used. Assembly of the cells of this invention should take place in a dry room, dry box or other dry environment, preferably at a relative humidity of 1-2% or better. The electrochemical cells described herein operate similarly to the prior art thionyl chloride systems in that the liquid phase transports the anode metal ions such as the lithium ion to the cathode current collector. However, the cathode component which is preferentially discharged, i.e., reduced, is the tetrachloroiodate. The oxyhalide or thiohalide may be discharged secondarily, if desired, as a secondary cathode.

EXAMPLE I

As an example of one embodiment of the invention, a cathode/cathode current collector may be formed by pressing a blend of about 50-90% $LiICl_4$ with about 50-10% of a conductive additive such as carbon black. In such an embodiment the high-surface-area cathode current collector is incorporated integrally with the solid phase of the cathode. A satisfactory pressed pellet may be obtained, for example, by mixing 90% $LiICl_4$ and 10% carbon and pressing the mixture lightly to about 75% density to form a porous pellet. A solution of $SOCl_2$ containing 0.1 mole of $LiAlCl_4$ per mole of $SOCl_2$ and saturated with $LiICl_4$ is then added to the pellet to fill the pores thereof. Alternatively, the pellet cathode/cathode current collector may be immersed in the solution.

The lithium anode and the pellet, when contacted to opposite sides of a porous separator and electrically contacted with lead wires and electrodes, forms a primary electrochemical cell.

When the structure or configuration of the cell requires, a separator will be used to provide physical separation between the anode and the cathode current collector. The separator is of an electrically insulative material and is unreactive with other cell components. Additionally, the separator must be porous to allow flow therethrough of the electrolyte solution. Typical separator materials are: PTFE, glass fiber, ceramic, paper, polypropylene and the like.

Exemplary cathode collector materials include graphite and various carbon blacks. In particular, acetylene blacks, such as Shawinigan black, are preferred. These materials are most preferably used in the form of a preformed porous body which may be formed by mixing the carbon or other material with a binder such as polytetrafluoroethylene and pressing the body into a pellet or other suitable form.

As already indicated, the electrolyte solution may comprise a thiohalide, such as thiophosphorylchloride ($SPCl_3$) or thiophosphorylbromide ($SPBr_3$) or a liquid oxyhalide, such as thionyl chloride ($SOCl_2$), thionyl bromide ($SOBr_2$), sulfuryl chloride ($SO_2Cl_2$), phosphoryl chloride ($POCl_3$), chromyl chloride ($CrOCl_2$), vanadyl chloride ($VOCl_3$), vanadyl bromide ($VOBr_3$) and selenium oxychloride ($SeOCl_2$), thionyl chloride being particularly preferred.

The electrolyte will also include a conductivity enhancing metal salt solute as already mentioned. Such salts as $LiAlCl_4$, $LiAl_2Cl_60$, $LiClO_4$, $LiAsF_6$, $LiSbF_6$, $LiSbCl_6$, $Li_2TiCl_6$, $LiSeCl_6$, $Li_2B_{10}Cl_{10}$, $Li_2B_{12}Cl_{12}$, $LiBCl_4$, $LiBF_4$, and others, $LiAlCl_4$ being most preferred, are used when the anode consists essentially of lithium or calcium.

Corresponding calcium salts may be used when the anode consists essentially of calcium. For example, such salts as the following may be used: $Ca(AlCl_4)_2$, $Ca(BCl_4)_2$, $Ca(ClO_4)_2$, $Ca(BF_4)_2$, $Ca(AsF_6)_2$, $Ca(SbF_6)_2$, $Ca(SbCl_6)_2$, $CaTiCl_6$, $CaB_{10}Cl_{10}$, and $CaB_{12}Cl_{12}$, $Ca(AlCl_4)_2$ being most preferred.

EXAMPLE II

In assembling another preferred cell of the invention, a high-surface-area cathode current collector an inert conductive material such as porous carbon is impregnated with electrolyte, such as the preferred thionyl chloride electrolyte containing dissolved lithium tetrachloroiodate, and is contacted to one side of a porous separator. The preferred lithium anode is brought into contact with the other side of the separator. Stainless steel, nickel or other inert electrodes may be used to contact the anode and cathode.

EXAMPLE III

Five can-negative (anode to can container contact) cells were prepared as follows:

With reference to FIG. 1, a lithium anode 10 (0.255 g) is pressed into a cylindrical 304L stainless steel can 12 (9 mm i.d. × 35 mm ht.) forming a well. A porous carbon element 14 (0.225 g composed of 90% Shawinigan black carbon and 10% Teflon) isolated from the lithium by means of a glass fiber filter separator 16 is placed into the lithium well. The can is then fitted with a 304L stainless steel cover 18 equipped with a fill tube 20 isolated from the cover by means of a glass feedthrough 22. The cover is then welded to the can to provide a hermetic seal.

A cathode/electrolyte solution 26, 1.4M $LiAlCl_4$ in $SOCl_2$, is saturated with $LiICl_4$. Assuming three electrochemical equivalents per mole, the $LiICl_4$ accounts for about 14% of the total capacity of the saturated solution. The solution is introduced into the cell assembly via the fill tube by a vacuum filling technique. The cell is closed by inserting a nickel wire 24 into the fill tube port 20, piercing the carbon element 14, thereby making electrical contact. A final hermetic seal is obtained by welding the current collector pin 24 to the fill tube 20.

CELL DISCHARGE DATA - EXAMPLE III

| Cell # | Stoichiometric Capacity (mAh) | Delivered Capacity (mAh) | | |
|---|---|---|---|---|
| | | To 3V (% Stoic.) | To 2V (% Stoic.) | Total (% Stoic.) |
| 1 | 798 | 467 (58.5) | 517 (64.8) | 589 (73.8) |
| 2 | 789 | 585 (74.1) | 618 (78.3) | 662 (83.9) |
| 3 | 774 | 559 (72.2) | 584 (75.5) | 599 (77.4) |
| 4 | 792 | 436 (55.1) | 604 (76.3) | 634 (80.1) |
| 5 | 798 | 591 (74.0) | 630 (78.9) | 668 (83.7) |
| | 790 | 528 (66.8) | 591 (74.8) | 630 (79.8) |

INITIAL VOLTAGES

| Cell # | OCV | Voltage Under Load | | |
|---|---|---|---|---|
| | | (100 kohm) | (10 kohm) | (1 kohm) |
| 1 | 3.73 | 3.73 | 3.73 | 3.69 |
| 2 | 3.65 | 3.65 | 3.65 | 3.50 |
| 3 | 3.68 | 3.68 | 3.67 | 3.64 |
| 4 | 3.70 | 3.70 | 3.69 | 3.67 |
| 5 | 3.65 | 3.65 | 3.65 | 3.62 |

EXAMPLE IV

In Example III, the metal container contacted both the anode and cathode. In order to minimize losses due to such a potential partial short circuit, cells were also constructed with the anode electrically isolated from the metal container.

Figure 2:
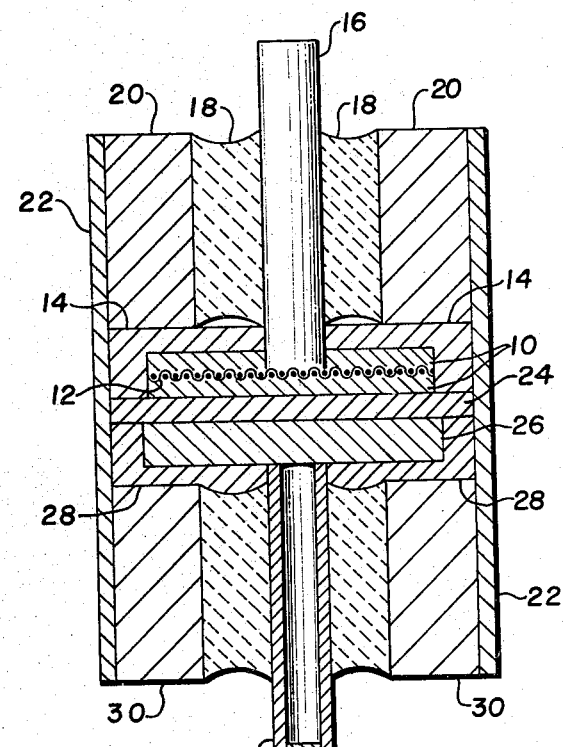
FIG. 2 is a schematic drawing of another embodiment of the invention.
Figure 3:
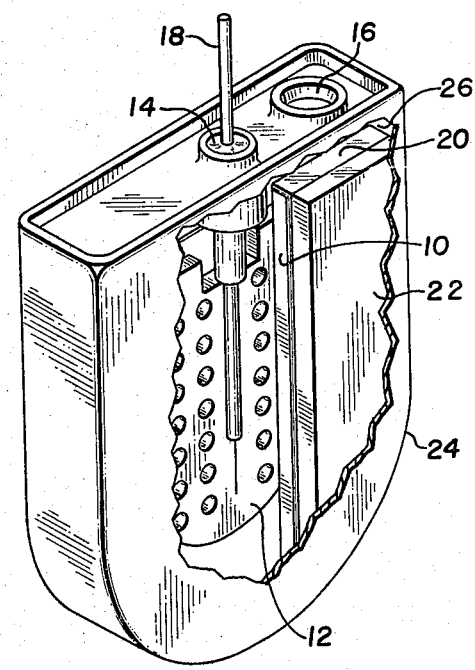
FIG. 3 is a perspective drawing of yet another embodiment of the invention with portions broken away for clarity.

Four such can-positive (no anode contact to can container) cells were prepared as follows:

With reference to FIG. 2, a disk 10 of lithium pressed about a grid 12 is placed into a Kynar cup 14. Grid 12 may be a stainless steel or nickel current collector grid. Kynar is a trademark of the Pennwalt Corporation for its vinylidene fluoride resins. The particular one referred to herein is polyvinylidene fluoride. Electrical contact is provided by means of a nickel pin or wire 16 which is welded into a glass feedthrough 18 carried in a stainless steel ring 20. The feedthrough assembly is then welded inside one end of a 304L stainless steel tube 22 which is 10 mm o.d. × 10 mm in length. This assembly provides the anode subassembly.

The cathodic components are inserted into the anode subassembly as follows. A glass fiber separator 24 is placed on the lithium surface such that it isolates the porous carbon element 26 which is inserted next. A second glass fiber separator 28 isolates the carbon element from the cover 30, a stainless ring, which is equipped with a metal filltube 32 as described in Example III. The cover 30 is welded in place in tube 22 as shown, providing a hermetic seal.

The cathode/electrolyte is introduced into the cell and absorbed by the carbon element 26 via a vacuum fill technique as in Example III. Electrical contact is made by inserting a nickel wire or pin (not shown) which pierces the carbon element. (See FIG. 1 for similar arrangement.) The cell is sealed by welding the nickel pin into the filltube as in FIG. 1.

| | | CELL DISCHARGE DATA - EXAMPLE IV $LiCl_4^-$ (Dissolved) | | | | | |
|---|---|---|---|---|---|---|---|
| | | Voltage Under Load | | | Capacity | | |
| Cell# | OCV | (100 kohm) | (10 kohm) | (1 kohm) | % Stoic To 0V | Stoic (mAh) | Delv'd (mAh) |
| 6 | 3.63 | 3.63 | 3.61 | 3.44 | 60.5 | 43 | 26 |
| 7 | 3.71 | 3.69 | 3.54 | 3.37 | 76.0 | 50 | 38 |
| 8 | 3.60 | 3.60 | 3.52 | 3.19 | 67.4 | 70 | 47 |
| 9 | 3.60 | 3.57 | 3.42 | 2.97 | 64.3 | 70 | 45 |

EXAMPLE V

Seven can-positive cells were prepared as outlined in Example IV, except the porous carbon element was partially filled with solid $LiICl_4$. This was accomplished by charging a reaction vessel with 15.86 g of $ICl_3$ and an excess of lithium chloride (3.0 g). The porous carbon elements were placed into the vessel and the apparatus was thoroughly degassed by standard techniques providing an argon blanket above the starting materials. Methylene chloride was added (40 ml) and chlorine gas was bubbled through the solution for 20 minutes and vented through an oil bubbler. The solvent was removed under vacuum, and the carbon elements partially filled with $LiICl_4$ were dried under $Cl_2$ stream. These partially filled carbon elements were removed from the vessel and placed into the cell assembly in a fashion identical to cells containing carbon elements without solid $LiICl_4$. Each carbon element absorbed approximately 0.75 g of $LiICl_4$ (26 mAhr cell).

| DISCHARGE DATA (CELLS CONTAINING SOLID LiICl$_4$) - EXAMPLE V | | | | | | | |
|---|---|---|---|---|---|---|---|
| | | Voltage Under Load | | | % Stoic | Capacity Stoic | Delv'd |
| Cell# | OCV | (100 kohm) | (10 kohm) | (1 kohm) | To OV | (mAh) | (mAH) |
| 1 | 3.71 | 3.70 | 3.63 | 3.07 | 52 | 75 | 39+ |
| 2 | 3.63 | 3.61 | 3.48 | 2.50 | 53 | 76 | 40 |
| 3 | 3.47 | 3.31 | 2.47 | 0.98 | 53 | 68 | 36 |
| 4 | 3.74 | 3.33 | 2.11 | 0.53 | 54 | 67 | 36 |
| 5 | 3.77 | 3.75 | 3.55 | 2.41 | 44 | 62 | 27 |
| 6 | 3.76 | 3.68 | 3.10 | 1.59 | 58 | 64 | 37 |
| 7 | 3.73 | 3.71 | 3.49 | 2.47 | 59 | 79 | 47 |

EXAMPLE VI

Fourteen can-positive cells were prepared as follows:

Lithium 10 (0.63 g) is pressed onto each side of a wire screen 12 (only one side shown) that is attached to a header assembly. The header assembly contained a glass to metal feedthrough 14 and a filling port 16 and a conductive feedthrough pin 18. The lithium is then isolated by means of a glass fiber separator 20. Two porous carbon elements 22 are placed into a stainless steel can 24. The lithium/header assembly is positioned in the can such that the carbon elements sandwich the lithium. The header assembly was then welded in place to the can. Note in the Figure that a space 26 may be provided for containing additional liquid such as cathode/electrolyte fill liquid.

In seven of the cells, the lithium anode was coated prior to assembly by painting a THF solution of vinyl chloride/vinyl acetate co-polymer[1]. In seven cells, no coating was applied. The cells were filled using the vacuum fill technique referred to above. For each set of cells, coated and uncoated, three batteries were filled with 1.4 M LiAlCl$_4$ in SOCl$_2$ that was also 0.8 M in ICl$_3$ and four batteries were filled with 1.4 M LiAlCl$_4$ in SOCl$_2$ that was also 0.8 M in LiICl$_4$. Finally, the batteries were welded closed.

[1] Union Carbide designation VAGH; also see U.S. Pat. No. 3,993,501

| | DISCHARGE DATA - EXAMPLE VI | | |
|---|---|---|---|
| Cell No. | Delivered Capacity mAh | Delivered Energy mWh | Utilization |
| Uncoated - 1.4 M LiAlCl$_4$, 0.8 M ICl$_3$ in SOCl$_2$ | | | |
| 1 | 1013. | 3128. | 37.94 |
| 2 | 1052. | 3401. | 39.16 |
| 3 | 1016. | 3302. | 38.17 |
| | 1027. | 3277. | 38.42 Average |
| | 22. | 138.2 | .650 Standard Deviation |
| Uncoated - 1.4 M LiAlCl$_4$, 0.8 M LiICl$_4$ in SOCl$_2$ | | | |
| 1 | 1884. | 6729. | 74.00 |
| 2 | 1904. | 6697. | 73.13 |
| 3 | 1854. | 6633. | 71.63 |
| 4 | 1880. | 6677. | 72.44 |
| | 1881. | 6684. | 72.80 Average |
| | 21. | 40.13 | 1.005 Standard Deviation |
| Coated - 1.4 M LiAlCl$_4$, 0.8 M ICl$_3$ in SOCl$_2$ | | | |
| 1 | 2112. | 5465. | 80.41 |
| 2 | 2251. | 7845. | 86.32 |
| 3 | 2260. | 7659. | 86.12 |
| | 2208. | 6990. | 84.28 Average |
| | 83. | 1324. | 3.356 Standard Deviation |
| Coated - 1.4 M LiAlCl$_4$; 0.8 M LiICl$_4$ SOCl$_2$ | | | |
| 1 | 2310. | 8222. | 90.04 |
| 2 | 2318. | 8095. | 91.23 |
| 3 | 2309. | 8177. | 90.35 |
| 4 | 2303. | 7983. | 90.52 |
| | 2310. | 8119. | 90.53 Average |
| | 6. | 104.9 | .503 Standard Deviation |

FIG. 4 is a graph of microcalorimeter data comparing the heat output of three samples: 1.4 M LiAlCl$_4$ in SOCl$_2$, 1.4 M LiAlCl$_4$ in SOCl$_2$ which is saturated with ICl$_3$, and 1.4 M LiAlCl$_4$ in SOCl$_2$ which is saturated with LiICl$_4$. As can be seen from the graph, steady state of the heat output of the samples was achieved after about 25 days. The sample of cathode/electrolyte, according to the invention (1.4 M LiAlCl$_4$ in SOCl$_2$, LiICl$_4$ saturated), was basically the same as that of the thionyl chloride cell (1.4 M LiAlCl$_4$ in SOCl$_2$), while that of the ICl$_3$ cell (1.4 M LiAlCl$_4$ in SOCl$_2$, ICl$_3$ saturated) was higher. FIG. 4 demonstrates that cells of the invention have a low self discharge rate comparable to that of thionyl chloride cells but which is improved over that of ICl$_3$ cells. The cells of the invention possess a capacity comparable to the ICl$_3$ cells which is better than prior art thionyl chloride cells.

Having described the invention, the exclusive property rights to which applicants are entitled are defined in the following claims:

What is claimed is:

1. An electrochemical cell comprising anode, cathode, and electrolyte elements, and means operatively associating the elements for the generation of electrical energy, wherein:
   (a) the anode is selected from the group of metals consisting essentially of lithium and calcium;
   (b) the electrolyte comprises a liquid inorganic solvent selected from the group consisting of $SOCl_2$, $POCl_3$, $SO_2Cl_2$, $SOBr_2$, $SeOCl_2$, $CrOCl_2$, $SPCl_3$, $VOCl_3$, $SPBr_3$ and $VOBr_3$, and a conductivity enhancing salt dissolved in the inorganic solvent, the anion of the salt being lithium when the anode is lithium and being lithium or calcium when the anode is calcium; and
   (c) the cathode consists essentially of a tetrachloroiodate salt of the general formula $M(ICl_4)_n$ and wherein:
   M=Li, Na, K, Rb, Cs, Sr or Ba when anode is lithium,
   M=Li, Na, K, Rb, Cs, Sr, Ba or Ca when the anode is calcium, and
   n=1 or 2.

2. The cell of claim 1 wherein the anode includes an organic passivation-limiting coating on at least the operative surface thereof.

3. The cell of claim 1 wherein at least a portion of the tetrachloroiodate salt is dissolved in the electrolyte.

4. The cell of claim 3 wherein the tetrachloroiodate salt is present in an amount sufficient to saturate the electrolyte.

5. The cell of claim 1 wherein at least a portion of the tetrachloroiodate salt is present in the form of a solid phase.

6. The cell of claim 1 wherein the means operatively associating the elements includes an electronically conductive high surface area electrode contacting the cathode.

7. The cell of claim 6 wherein the electrode is porous carbon and contains a solid phase of the cathode salt.

8. The cell of claim 6 wherein the high surface area electrode is a porous body.

9. The cell of claim 8 wherein the body is porous carbon.

10. The cell of claim 8 wherein the body comprises acetylene black and binder.

11. An electrochemical cell having an anode consisting essentially of lithium, an electrolyte consisting essentially of thionyl chloride, a cathode consisting essentially of lithium tetrachloroiodate associated with the anode and the electrolyte and a conductivity enhancing lithium salt dissolved in the electrolyte for enhancing the conductivity thereof with respect to the anode metal ions.

12. The cell of claim 11 wherein the anode includes an organic passivation limiting coating on at least the operative surface thereof.

13. The cell of claim 11 wherein at least a portion of the tetrachloroiodate salt is dissolved in the electrolyte.

14. The cell of claim 13 wherein the tetrachloroiodate salt is present in an amount sufficient to saturate the electrolyte.

15. The cell of claim 11 wherein at least a portion of the lithium tetrachloroiodate is present in the form of a solid phase.

16. The cell of claim 10 including a porous carbon cathode current collector contacting the cathode and the electrolyte.

17. The cell of claim 16 including a solid phase of lithium tetrachloroiodate.

18. The cell of claim 17 wherein at least a portion of the solid lithium tetrachloroiodate is contained within the porous carbon.

* * * * *

UNITED STATES PATENT AND TRADEMARK OFFICE
CERTIFICATE OF CORRECTION

PATENT NO. : 4,465,743

DATED : August 14, 1984

INVENTOR(S) : Paul M. Skarstad et al

It is certified that error appears in the above-identified patent and that said Letters Patent are hereby corrected as shown below:

Column 4, Line 64, after the word "collector" and before the word "an" insert --of--.

Column 7, Line 67, a space should be inserted after "1.4M" and before "$LiAlCl_4$".

Signed and Sealed this

Twenty-sixth Day of February 1985

[SEAL]

Attest:

DONALD J. QUIGG

Attesting Officer

Acting Commissioner of Patents and Trademarks